United States Patent
Kohara

(10) Patent No.: US 7,446,912 B2
(45) Date of Patent: Nov. 4, 2008

(54) IMAGE READING APPARATUS

(75) Inventor: Ryuichi Kohara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 140 days.

(21) Appl. No.: 11/509,642

(22) Filed: Aug. 25, 2006

(65) Prior Publication Data

US 2007/0064285 A1    Mar. 22, 2007

(30) Foreign Application Priority Data

Sep. 25, 2006 (JP) .............................. 2005-269538

(51) Int. Cl.
  *H04N 1/04* (2006.01)
(52) U.S. Cl. .................. 358/496; 358/498; 358/471; 358/474; 358/486; 358/475
(58) Field of Classification Search ............... 358/461, 358/486, 496, 498, 471, 475, 505, 501, 474; 382/274, 318, 319; 399/367, 374
See application file for complete search history.

(56) References Cited

U.S. PATENT DOCUMENTS 5,373,352 A * 12/1994 Uto ........................... 399/203
5,453,850 A * 9/1995 Akuzawa et al. ............ 358/475
5,506,695 A * 4/1996 North ......................... 358/474
5,844,697 A * 12/1998 Omvik et al. ................ 358/487
6,268,599 B1 * 7/2001 Chen et al. ............... 250/208.6
7,218,426 B2 * 5/2007 Sugano ....................... 358/475
7,289,249 B2 * 10/2007 Sone ........................... 358/461

FOREIGN PATENT DOCUMENTS

JP     2005-005957         1/2005
JP     2005005957 A   *   1/2005

* cited by examiner

*Primary Examiner*—Cheukfan Lee
(74) *Attorney, Agent, or Firm*—Rabin & Berdo, PC

(57) ABSTRACT

An image reading apparatus according to this invention includes a document conveyance unit mounted movably from a position facing an upper surface of a document table to an upper position for conveying a document medium to place the document medium on the document table, a reading unit having an aperture for optically reading information from the document medium, a shielding member arranged to be slidable in a direction parallel to the upper surface of the document table for shielding the aperture, a detection unit for detecting whether the document conveyance unit covers the upper surface of the document table, and a control unit for controlling movement of the shielding member. With the image forming apparatus having such the structure, a document reading time can be shortened where successively reading document media of plural sheets while preventing foreign materials from attaching to the reading unit.

7 Claims, 8 Drawing Sheets

POSITION A    POSITION B ion unit.

IMAGE READING APPARATUS

BACKGROUND OF THE INVENTION

1. Field of the Invention

This invention relates to an image reading apparatus having an image reading unit for reading information from a document medium on which images are formed and a control unit for executing processing for controlling the image reading unit.

2. Description of Related Art

Conventionally, an image reading apparatus reads a document through reading glass while conveying the document with a reading unit secured at a document reading position. With such a reading unit, where a foreign material, such as, e.g., debris or dust, attaches to the reading unit, the foreign material is reproduced as a vertical streak on a read image. Therefore, for example, as described in Japanese Unexamined Patent Publication No. 2005-5957, such an image reading apparatus has an openable shutter on an upper surface of the reading glass to prevent foreign materials from attaching to the reading glass by rendering the shutter open at the time of reading.

Such a conventional image reading apparatus, however, raises a problem that the reading time becomes long where successively reading document media of plural sheets as preventing foreign materials from attaching to the reading unit because rendering the shutter open and closed at each reading time of the document media.

This invention is made in consideration of the above described problem, and it is an object of this invention to provide an image reading apparatus capable of shortening a document reading time where successively reading a plurality of the document media while preventing foreign materials from attaching to the reading unit.

SUMMARY OF THE INVENTION

To achieve the above object, the image reading apparatus according to this invention has a document conveyance unit mounted movably from a position facing an upper surface of a document table to an upper position for conveying a document medium to place the document medium on the document table, a reading unit having an aperture for optically reading information from the document medium, a shielding member movably arranged to be slidable in a direction parallel to the upper surface of the document table for shielding the aperture, a detection unit for detecting whether the document conveyance unit covers the upper surface of the document table, and a control unit for controlling movement of the shielding member, wherein the control unit moves the shielding member to a position at which the aperture is shielded where the detection unit detects that the document conveyance unit does not cover the document table, and wherein the control unit moves the shielding member to a position at which the aperture is opened where the detection unit detects that the document conveyance unit covers the document table.

According to this invention, where the detection unit detects that the document conveyance unit covers the upper surface of the document table, the shielding member is moved to a position at which the aperture is opened. On the other hand, where the detection unit detects that the document conveyance unit does not cover the document table, the shielding member is moved to a position at which the aperture is shielded. Thus, the image reading apparatus operates to prevent the foreign material from attaching to the reading unit.

As described above, an image reading apparatus according to this invention is capable of shortening a document reading time where successively reading a plurality of the document media while preventing foreign materials from attaching to the reading unit.

BRIEF DESCRIPTION OF THE DRAWINGS

This invention may take physical form in certain parts and arrangements of parts, a preferred embodiment and method of which is described in detail in this specification and illustrated in the accompanying figures which form a part hereof, and wherein.

DETAILED DESCRIPTION OF PREFERRED EMBODIMENTS OF THE INVENTION

Figure 1:
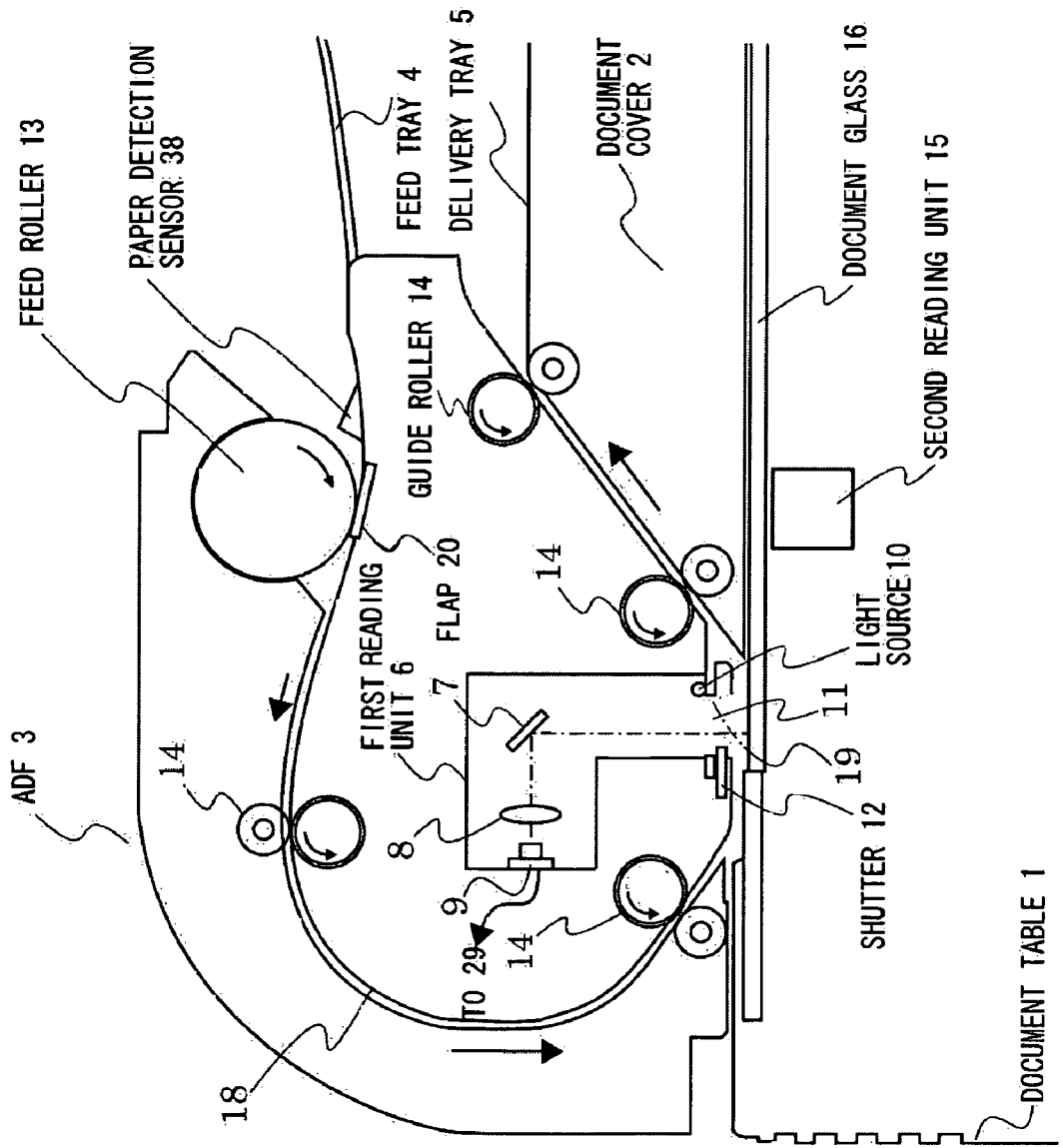
FIG. 1 is a cross-sectional view showing an image reading apparatus according to the first embodiment of this invention.
Figure 2:
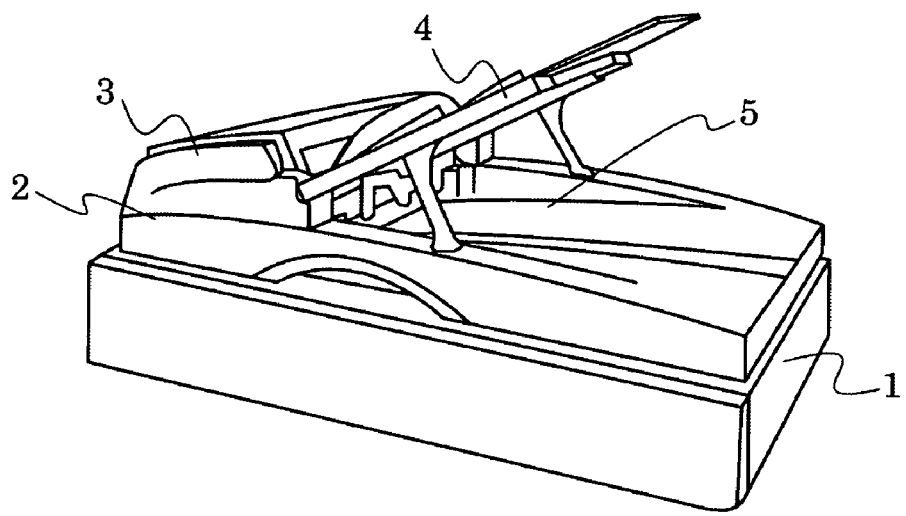
FIG. 2 is a perspective view showing the image reading apparatus in FIG. 1.

Hereinafter, a first embodiment according to this invention is described in detail with reference to the figures. FIG. 1 is a cross-sectional view showing an image reading apparatus according to the first embodiment of this invention. FIG. 2 is a perspective view showing the image reading apparatus according to the first embodiment in FIG. 1.

The image reading apparatus according to this invention has a document table 1, a document cover 2, an automatic document feeder (ADF) 3, a feed tray 4, and a delivery tray 5.

The document table 1 has an upper surface to hold a document medium. The document cover 2 prevents outside light from undesirably entering where the document medium held on an upper surface of the document table 1 is read. The automatic document feeder (ADF) 3 conveys a document medium stacked on the feed tray 4 to the document table 1. The feed tray 4 stacks document media or a document medium to be read via ADF 3. The delivery tray 5 stacks the document medium having been read. The document cover 2, the automatic document feeder (ADF) 3, and the delivery tray 5 are formed unitedly as a document conveyance unit. The document conveyance unit is pivotably attached to render the document conveyance unit covering the document table 1 as well as not covering the document table 1.

Figure 3:
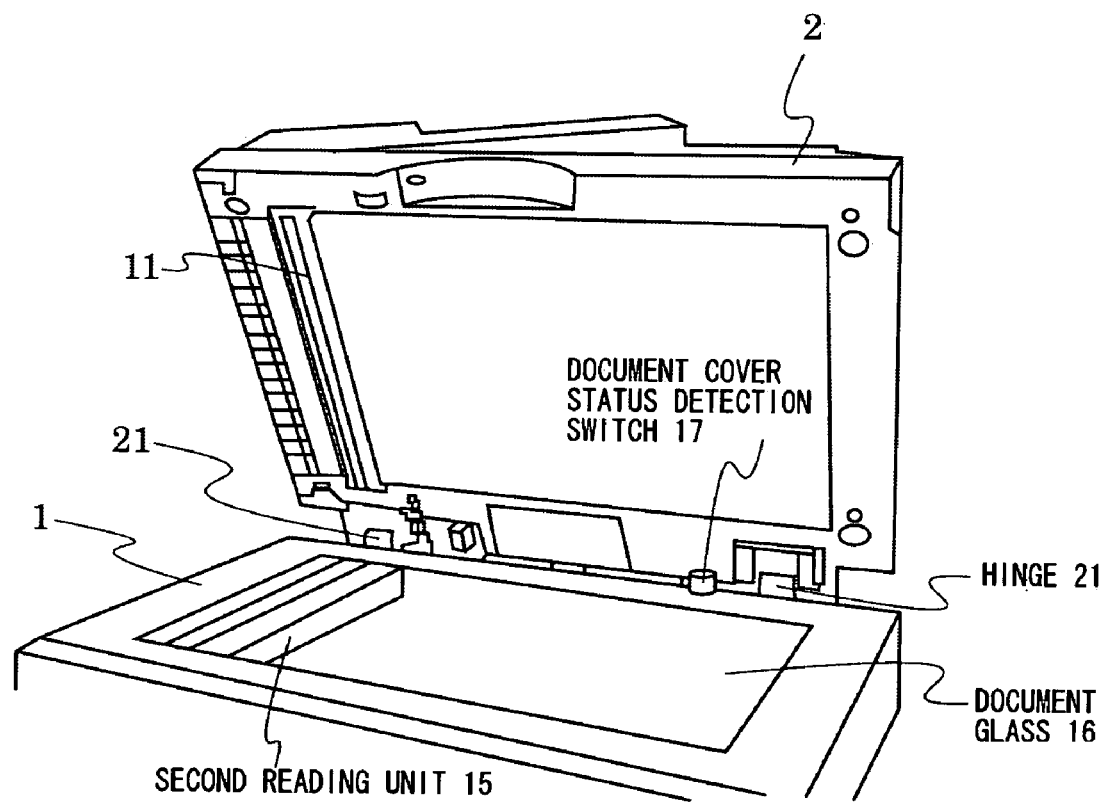
FIG. 3 is a perspective view showing the image reading apparatus in FIG. 2, where a document conveyance unit does not cover an upper surface of a document table.

FIG. 3 is a perspective view showing the image reading apparatus in FIG. 2, where the document conveyance unit does not cover the upper surface of the document table. As shown in FIG. 3, the image reading apparatus according to this invention further includes a second reading unit 15, a document glass 16, a document cover status detection switch 17, and a hinge 21. The second reading unit 15 is a reading unit for optically reading information on the document medium held on the document glass 16. The document glass 16 is arranged on the upper surface of the document table 1, and operates to pass reflected light from the document medium through the document glass 16 where reading by the second reading unit 15. The document cover status detection switch 17 detects whether the document cover 2 covers the document table 1. The hinge 21 connects the document cover 2 with the document table 1 to move pivotally the document cover 2.

As shown in FIG. 1, the image reading apparatus further has a first reading unit 6, a shutter 12, a feed roller 13, a guide roller 14, a document conveyance route 18, a flap 20, and a paper detection sensor 38. The first reading unit 6 optically reads information on the document medium stacked on the feed tray 4. The first reading unit 6 includes a mirror 7, a lens 8, a CCD (image pickup device) 9, a light source 10, and an aperture 11. The mirror 7 reflects light from the document medium as reflection light and guides the reflection light to the CCD 9. The lens 8 condenses the reflection light reflected by the mirror 7. The CCD 9 is an image pickup device for photoelectrically converting light condensed by the lens 8 into an electric signal, and the picked up electric signal is input as information of an image and the like to a microprocessor peripheral unit 29 as described below. The light source 10 generates reflection light by irradiating the document medium. The aperture 11 guides the reflection light from the document medium to an interior of the first reading unit 6. The shutter 12 renders the aperture 11 either open or closed. The feed roller 13, operating together with the flap 20, separates the document medium stacked on the feed tray 4 one by one and conveys the medium into an interior of the ADF 3. The guide roller 14 drives the document medium going through the document conveyance route 18. The document conveyance route 18 operates not only to convey the document medium separated by the feed roller 13 to a document reading position 19 but also to convey the document medium having finished being read to the delivery tray 5. A paper detection sensor 38 detects whether the document medium exists in the feed tray 4.

Figure 4A:
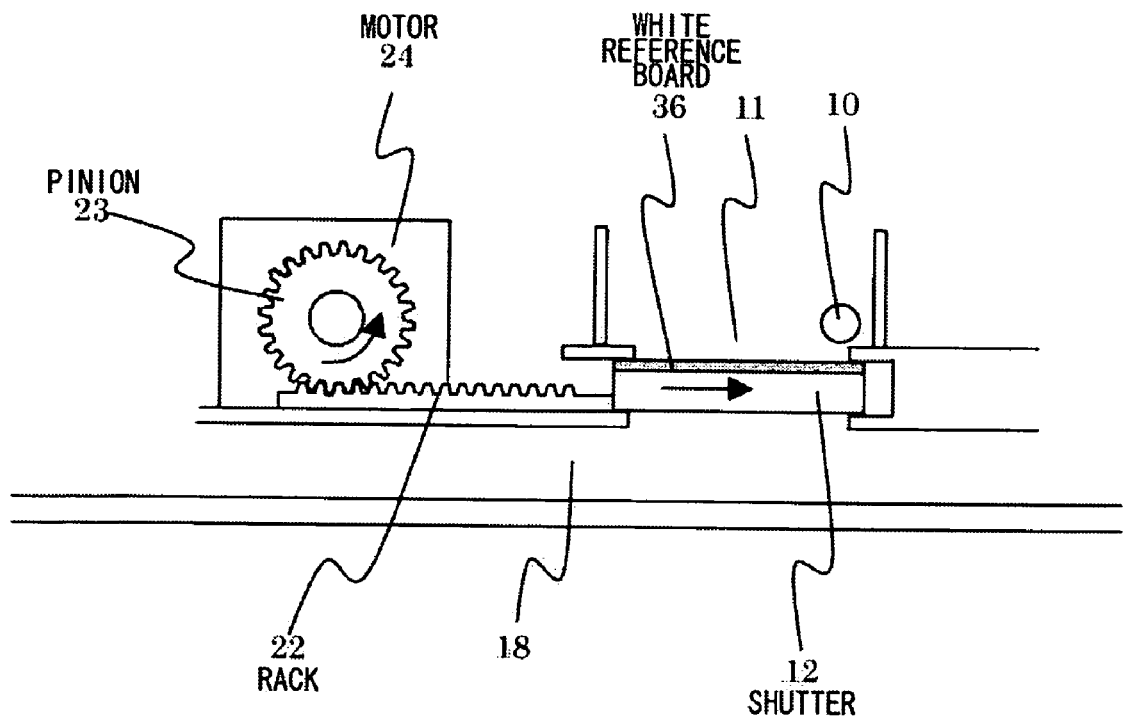
FIG. 4A is a cross-sectional view showing a structure around a shielding member of the image reading apparatus in FIG. 1, where the shielding member shields an aperture.
Figure 4B:
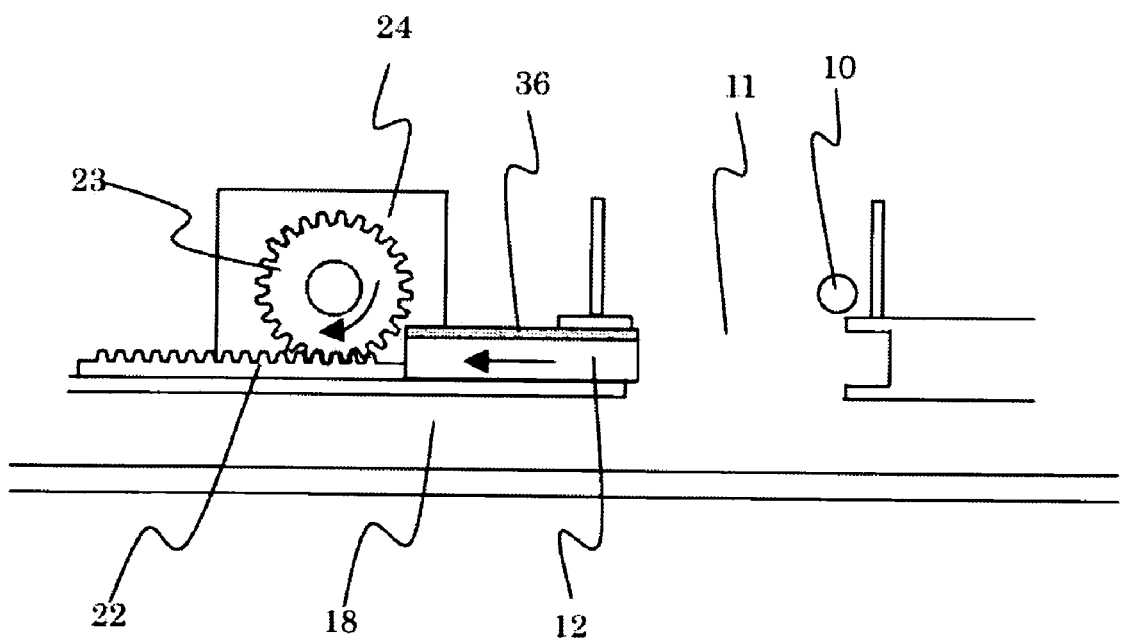
FIG. 4B is a cross-sectional view showing a structure around the shielding member of the image reading apparatus in FIG. 1, where the shielding member opens the aperture.

FIG. 4A is a cross-sectional view showing a structure around the shielding member of the image reading apparatus in FIG. 1 where the shielding member shields the aperture. FIG. 4B is a cross-sectional view showing a structure around the shielding member of the image reading apparatus in FIG. 1 where the shielding member is opened. The shutter 12, a rack 22, a pinion 23, a motor 24 serving as a driving unit, and a white reference board 36 are formed around the shielding member of the image reading apparatus. The rack 22 is connected with the pinion 23. The pinion 23 is formed rotatably. The motor 24 provides the pinion 23 with rotation driving force. The white reference board 36 is secured to a surface facing the first reading unit 6 of the shutter 12.

Figure 5A:
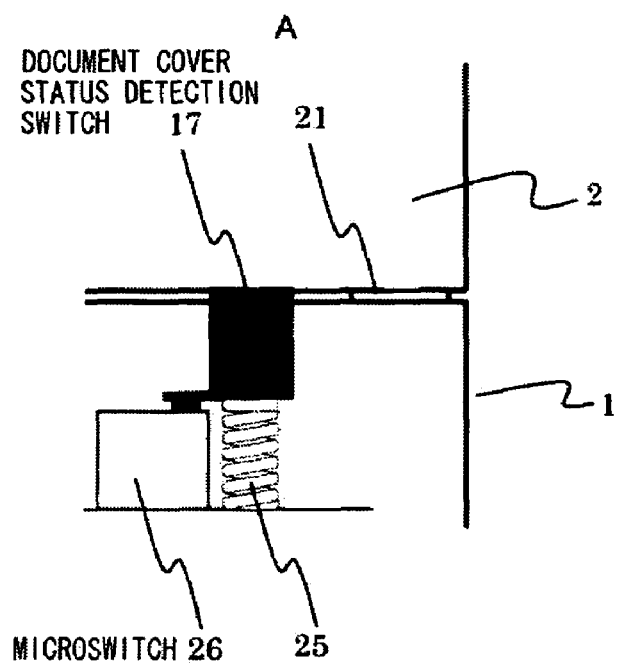
FIG. 5A is a cross-sectional view showing a detection unit, which detects that the document conveyance unit covers the upper surface of the image reading apparatus in FIG. 1.
Figure 5B:
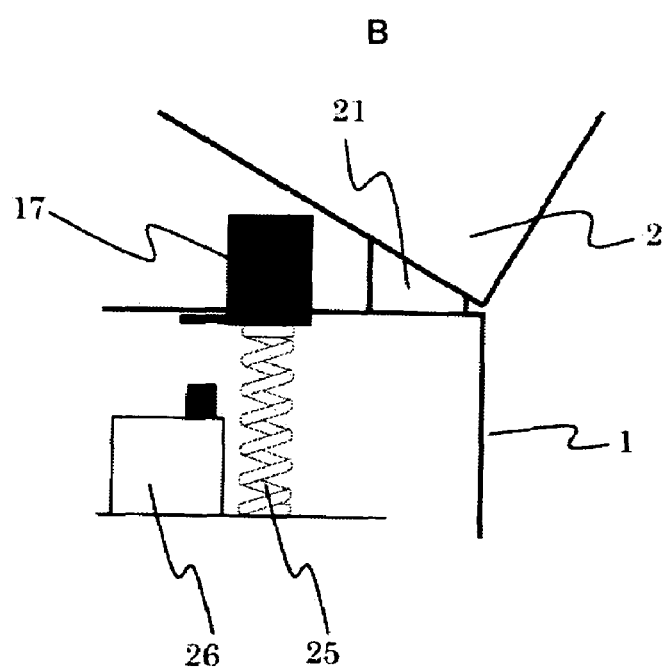
FIG. 5B is a cross-sectional view showing the detection unit, which detects that the document conveyance unit does not cover an upper surface of the image reading apparatus in FIG. 1.

FIG. 5A is a cross-sectional view showing a detection unit where detecting that the document conveyance unit covers the upper surface of the image reading apparatus in FIG. 1. FIG. 5B is a cross-sectional view showing a detection unit where detecting that the document conveyance unit does not cover the upper surface of the image reading apparatus in FIG. 1. This detection unit is formed with a document cover status detection switch 17, a spring 25, and a micro switch 26. The document cover status detection switch 17 is attached to the upper surface of the document table 1 in a manner that the document cover status detection switch 17 can move up and down. One end of the spring 25 is connected to a lower end of the document cover status detection switch 17, and the other end of the spring 25 is secured to an interior of the document table 1. The spring 25 urges the document cover status detection switch 17 so that the document cover status detection switch 17 is placed at an upper side. The micro switch 26 is secured to an interior of the document table 1. The micro switch 26 is switched off where the document cover status detection switch 17 is positioned at the upper side as shown in FIG. 5A, and is switched on where the document cover status detection switch 17 is positioned at a lower side as shown in FIG. 5B.

Figure 6:
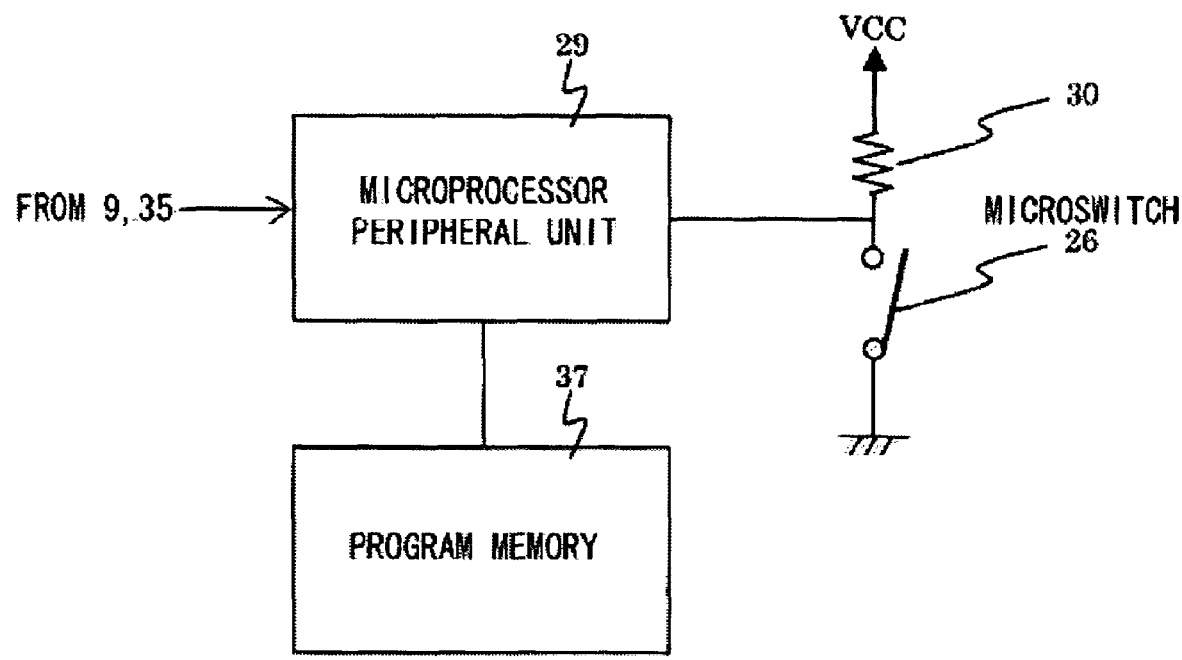
FIG. 6 is a circuit diagram of the image reading apparatus according to the first embodiment of this invention.

FIG. 6 is a circuit diagram of the image reading unit according to the first embodiment of this invention. FIG. 6 shows a circuit diagram around the document cover status detection switch 17, where one end of a resister 30 is connected to an internal power source (VCC), and where the other end of the resister 30 is connected not only to an input port of a microprocessor peripheral unit 29 but also to one end of the micro switch 26. The other end of the micro switch 26 is grounded. Furthermore, a microprocessor of the microprocessor peripheral unit 29 is connected to a program memory 37, and thus an entire image processing apparatus is controlled based on a program stored in the program memory 37.

Figure 7:
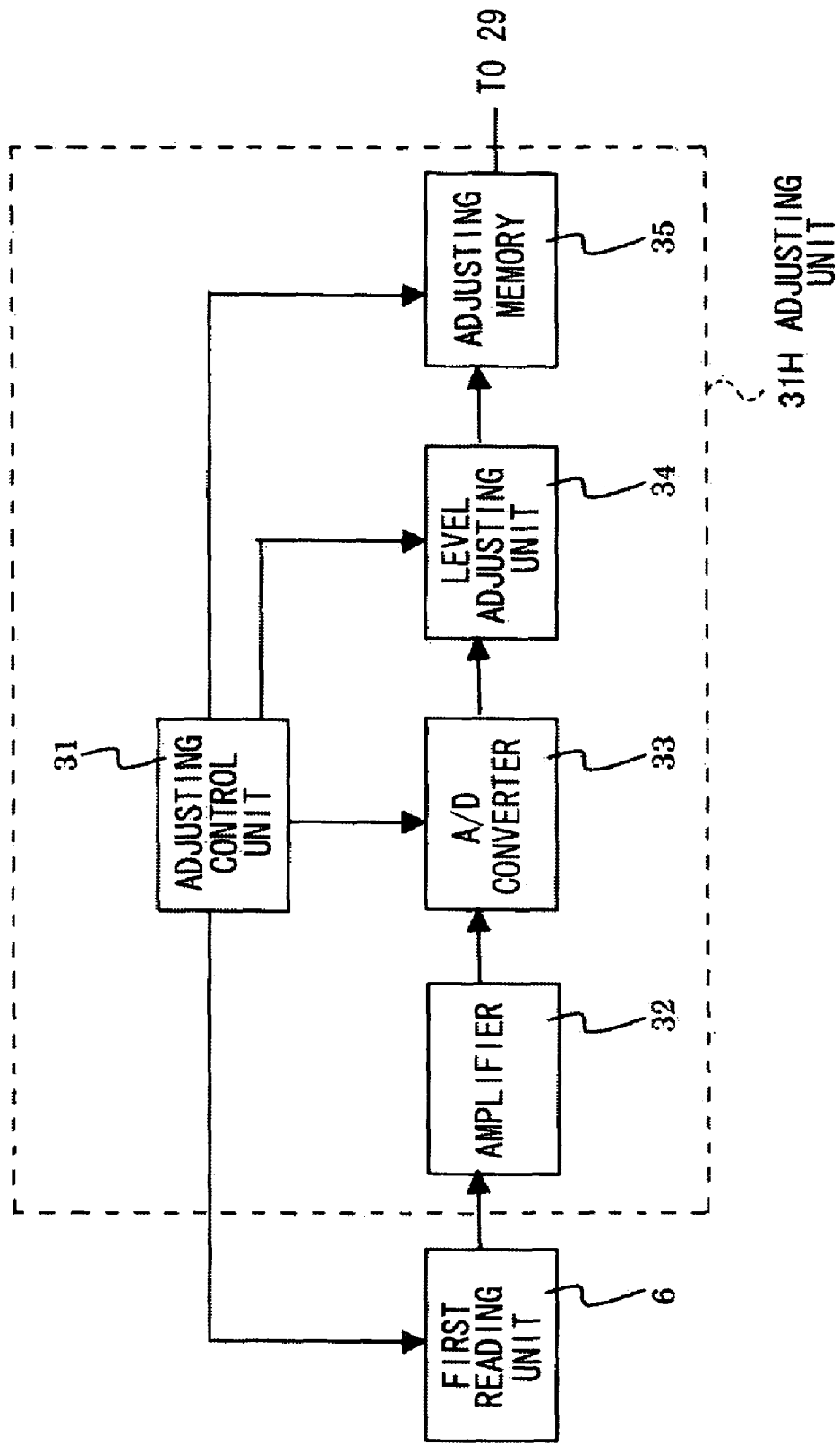
FIG. 7 is a block diagram showing an adjusting unit for adjusting a document reading density of the image reading apparatus according to the first embodiment of this invention and arrangements therearound.

FIG. 7 is a block diagram showing an adjusting unit for adjusting a document reading density of the image reading apparatus according to the first embodiment of this invention. The image reading apparatus includes the adjusting unit 31H for adjusting and controlling the document reading density based on the document reading density read with the first reading unit 6. The adjusting unit 31H includes an adjusting control unit 31, an amplifier 32, an A/D converter 33, a level adjusting unit 34, and an adjusting memory 35. The adjusting control unit 31 outputs, during an adjusting operation, an adjusting control signal to the first reading unit 6, the A/D converter 33, the level adjusting unit 34, and the adjusting memory 35, thus controlling an entire process during the adjustment. The amplifier 32 amplifies a weak analog electric signal output from the first reading unit 6 to a level necessary for an input to the A/D converter 33. The A/D converter 33 converts an analog electronic signal amplified and output by the amplifier 32 into a digital signal. In a case that the input signal is out of a predetermined range, the level adjusting unit 34 level-shifts or adjusts the input signal to a predetermined value and outputs the value. The adjusting memory 35 is a nonvolatile memory for storing an adjusting output signal from the level adjusting unit 34. The microprocessor peripheral unit 29 not only receives the adjusting output signal and adjusts the document reading density but also includes a control unit for controlling movement of the shutter 12.

In operation of the image reading apparatus according to the first embodiment of this invention, there are two types of reading methods as the operation of the image reading apparatus. According to the first reading method, the document medium stacked on the feed tray 4 and conveyed by ADF 3 is read by the first reading unit 6 secured at the document reading position 19. According to the second reading method, the document medium held at the document glass 16 is read by the second reading unit 15 while the second reading unit 15 is moved.

Hereinafter, operation for carrying out reading according to the first reading method is described with reference to FIG. 1 to FIG. 7. An operator renders the document cover 2 covering the document table 1 and sets the document media on the feed tray 4. After the paper detection sensor 38 detects paper or the document media on the feed tray 4, the image reading apparatus drives a feed roller 13 to separate the document media one by one. A separated document medium is conveyed to the document reading position 19 via the document conveyance route 18.

Furthermore, the operator selects a reading mode on an operation panel, not shown, and then starts reading operation. The document medium positioned at the document reading position 19 is irradiated by irradiating light from the light source 10, and thus the reflection light thereof enters into an interior of the first reading unit 6 via the aperture 11. The entered reflection light is reflected by the mirror 7, and then condensed with the lens 8. The condensed light is input into the CCD 9, and is converted into an electric signal. The converted electronic signal is input into the microprocessor peripheral unit 29. The microprocessor peripheral unit 29, also having an image processing unit, carries out image processing and outputs a processed signal as an image signal. The document medium already read is conveyed via the document conveyance route 18. Where the document medium is remaining on the feed tray 4, those operations described above are repeated until the document medium is exhausted. Thus, a plurality of the document media are read successively.

Figure 9:
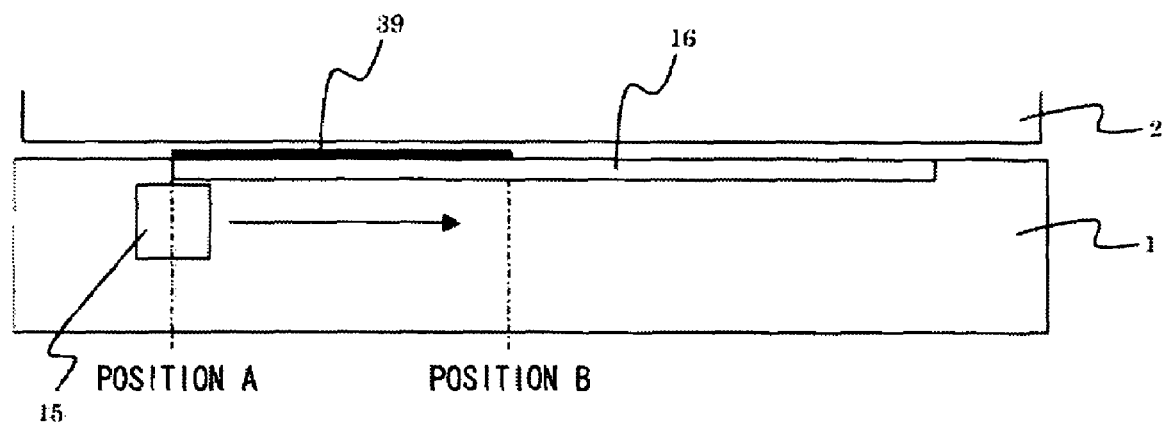
FIG. 9 is a cross-sectional view showing a variation of a reading unit of the image reading apparatus in FIG. 1, where a second reading unit is moved while the document conveyance unit covers the upper surface of the document table.

FIG. 9 is a cross-sectional view showing a portion around a second reading unit 15 of the image reading apparatus in FIG. 1 according to the second reading method in which the second reading unit 15 is moved while the document conveyance unit covers the upper surface of the document table 1. Operations for carrying out reading according to the second reading method is described below. The operator renders the document cover 2 not covering the document table 1, and sets the document medium 39 on the document glass 16. Subsequently, the operator renders the document cover 2 covering the document table 1. The operator selects the reading mode on the operation panel and starts reading. The second reading unit 15 reads the document medium 39 held on the document glass 16 while moving from a position A to a position B. After finishing reading, the second reading unit 15 returns to the original position A.

During such reading operation, the operator can render the document cover 2 either covering the document table 1 or not covering the document table 1. As shown in FIG. 5A, where the document cover 2 covers the document table 1, the document cover status detection switch 17 contacts the document cover 2 to be positioned at the lower side in opposing urging force of the spring 25. Consequently, the micro switch 26 is turned on. When the micro switch 26 is turned on, an input port of the microprocessor peripheral unit 29 in FIG. 6 is grounded, becoming logically low level.

On the other hand, as shown in FIG. 5B, where the document cover 2 is not covering the document table 1, the document cover status detection switch 17 is positioned at the upper side by a non-contact with the document cover 2 according to the urging force of the spring 25. Consequently, the micro switch 26 is turned off. When the micro switch 26 is turned off, the input port of the microprocessor peripheral unit 29 in FIG. 6 is connected to the internal power source (VCC) via a resistor 30, becoming logically high level.

The microprocessor peripheral unit 29 monitors a status of the input port at a predetermined cycle, thus detecting the status of the document cover 2. Where it is detected that the document cover 2 covers the document table 1, the microprocessor 29 drives the motor 24 in a clockwise direction as shown in FIG. 4B. Driving force of the motor 24 is transmitted to the shutter 12 via the rack 22 and the pinion 23. Consequently, the shutter 12 opens the aperture 1.

On the other hand, where it is detected that the document cover 2 does not cover the document table 1, the microprocessor 29 drives the motor 24 in a counterclockwise direction as shown in FIG. 4A. The driving force of the motor 24 is transmitted to the shutter 12 via the rack 22 and the pinion 23. The shutter 12 thus shields the aperture 11. The microprocessor peripheral unit 29 instructs the adjusting control unit 31 to execute an adjusting operation at a certain cycle where the shutter 12 shields the aperture 11. The adjusting control unit 31, upon instructed to carry out the adjusting operation, causes the first reading unit 6 to execute reading operation. Since the shutter 12 shields the aperture in this situation, the first reading unit 6 reads the white reference board 36 arranged on a surface facing a first reading unit of the shutter 12. Read optical information of the white reference board 36 is converted into an electric signal at the first reading unit 6, and is amplified at the amplifier 32, subsequently being converted into a digital signal at the A/D converter 33. Furthermore, the optical information is further input into the level adjusting unit 34, where the optical information is compared as to whether signal level of each read pixel is in a reference range. If it is determined being in the reference range, a pixel signal is written to the adjusting memory 35. If it is determined being out of the reference range, the pixel signal is converted into a pixel signal within the reference range, and the converted pixel signal is then written to the adjusting memory 35.

Where the shutter 12 opens the aperture 11, after the shutter 12 has shielded the aperture, the microprocessor peripheral unit 29 instructs the adjusting control unit 31 to execute the adjusting operation at a certain cycle. After the adjusting operation is finished, the shutter 12 opens the aperture 11 again.

The image reading apparatus according to the first embodiment of this invention has an effect to prevent foreign materials from attaching to the first reading unit 6 without extending document reading time, because of having the structure to enable the shutter 12 to open the aperture where the document cover 2 covers the document table 1, and to shield the aperture 11 even where the document cover 2 does not cover the document table 1 as described above.

Figure 8A:
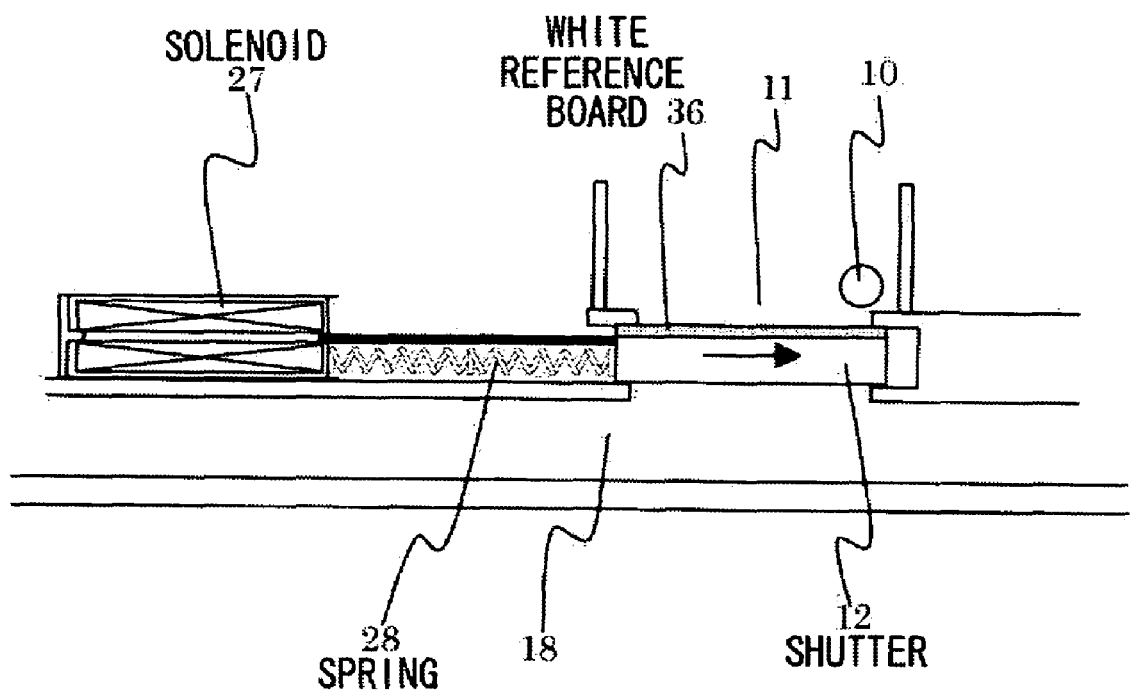
FIG. 8A is a cross-sectional view showing the shielding member of the image reading apparatus according to the second embodiment of this invention and arrangements therearound, where the shielding member shields the aperture.
Figure 8B:
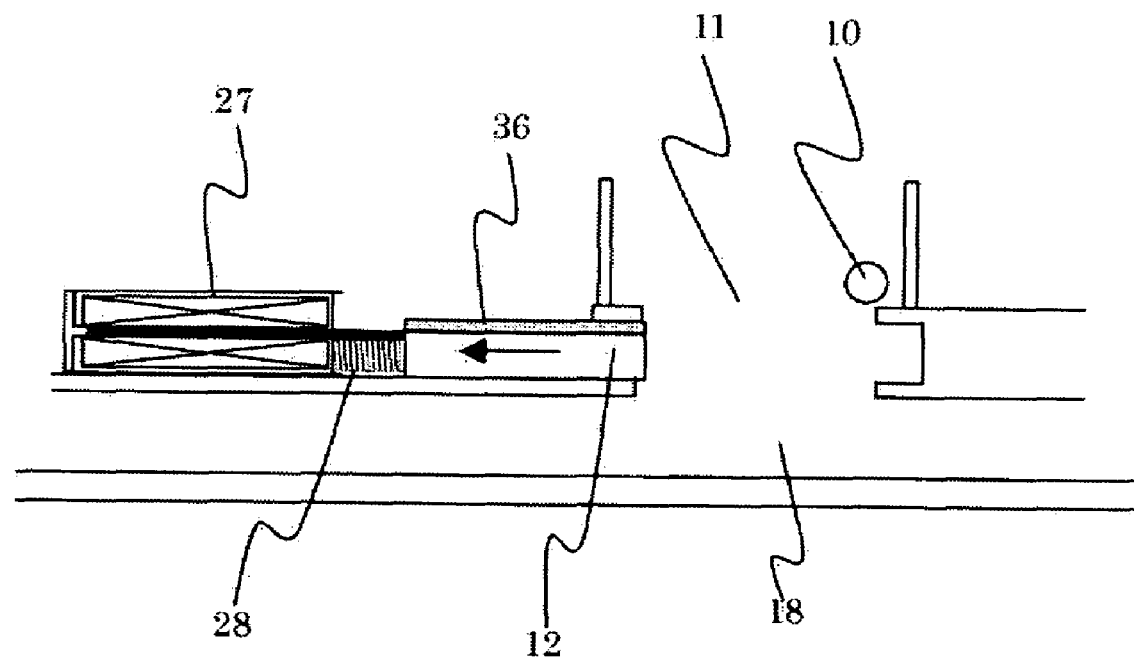
FIG. 8B is a cross-sectional view showing the shielding member of the image reading apparatus according to the second embodiment of this invention and arrangements therearound, where the shielding member is opened.

Hereinafter, the second embodiment according to this invention is described in detail with reference to the figures. FIG. 8A is a cross-sectional view showing a portion around a shielding member of the image reading apparatus according to the second embodiment of this invention, where the shielding member shields the aperture. FIG. 8B is a cross-sectional view showing a portion around the shielding member of the image reading apparatus according to the second embodiment of this invention, where the shielding member opens the aperture.

At a periphery of the shielding member of the image reading apparatus, the second embodiment of this invention includes the shutter 12, a solenoid 27, a spring 28 serving as an urging unit, and the white reference board 36. One end of the spring 28 is connected to the shutter 12, and the other end thereof is secured to an interior of ADF3 together with the solenoid 27. The white reference board 36 is secured to a surface facing the first reading unit 6 of the shutter 12. The shutter 12 is urged by the spring 28 in a direction to shield the aperture 11. The solenoid 27 drives the shutter 12 in a direction opposite to a direction of the urging force of the spring 28. The aperture 11 is opened where the solenoid 27 is driven, and the aperture 11 is shielded where the solenoid 27 is not driven.

At a periphery of the shielding member of the image reading apparatus, the second embodiment of this invention is different from that of the first embodiment with respect to driving movement of the shutter 12. Hereinafter, the driving movement of the shutter 12 is described.

Where the document cover 2 is detected covering the document table 1, the microprocessor 29 operates to drive the solenoid 27. Where the solenoid 27 is driven, the shutter 12 moves in a direction to open the aperture, and the aperture 11 is opened as shown in FIG. 8B.

On the other hand, where the document cover 2 is detected not covering the document table 1, the microprocessor 29 operates to stop driving the solenoid 27. In this case, as shown in FIG. 8A, the shutter 12 is moved in a direction to shield the aperture 11 by the urging force of the spring 28, and the aperture 11 is shielded. Furthermore, where the image reading apparatus is powered off, the shutter 12 moves in a direction to shield the aperture 11 by the urging force of the spring 28, thus shielding the aperture 11, since the solenoid 27 is not driven.

As described above, at a periphery of the shielding member of the image reading apparatus, the second embodiment of this invention includes the shutter 12, the solenoid 27, the spring 28, and the white reference board 36. Since the urging method of the spring 28 and the driving method of the solenoid 27 are connected, this invention is ideal for an image reading apparatus requiring fast operation.

This invention is applicable to an image reading apparatus mounted in, e.g., a scanner, an image forming apparatus, a multi-functional machine, a photocopier, and an optical character reading apparatus.

The foregoing description of the preferred embodiments according to the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image reading apparatus comprising:
    a document conveyance unit mounted movably from a position facing an upper surface of a document table to an upper position for conveying a document medium to place said document medium on said document table;
    a reading unit having an aperture for optically reading information from said document medium;
    a shielding member arranged to be slidable in a direction parallel to said upper surface of said document table for shielding said aperture;
    a detection unit for detecting whether said document conveyance unit covers said upper surface of said document table; and
    a control unit for controlling movement of said shielding member,
    wherein said control unit moves said shielding member to a position at which said aperture is shielded where said detection unit detects that said document conveyance unit does not cover said document table,
    and wherein said control unit moves said shielding member to a position at which said aperture is open where said detection unit detects that said document conveyance unit covers said document table.

2. The image reading apparatus according to claim 1, wherein said reading unit is arranged in said document conveyance unit.

3. The image reading apparatus according to claim 1, wherein said control unit includes an urging unit for urging said shielding member in a direction to shield said aperture.

4. The image reading apparatus according to claim 1, wherein said control unit includes a driving unit for moving said shielding member to said position at which said aperture is shielded or said position at which said aperture is open.

5. The image reading apparatus according to claim 1 further comprising an adjusting unit for adjusting reading density information read out of said reading unit, wherein said image reading apparatus makes a surface of said shielding member opposite to a surface thereof facing said upper surface of said document table a density reference.

6. The image reading apparatus according to claim 5, wherein said shielding member has a white reference board superposed on said surface of said shielding member opposite to said surface thereof facing said upper surface of said document table, and wherein said white reference board is opposite to said reading unit.

7. The image reading apparatus according to claim 5, wherein said adjusting unit includes:
    an adjusting control unit for generating a control signal for adjusting said reading density information;
    an amplifier for amplifying said reading density information;
    an A/D converter for converting amplified reading density information into digital information upon receiving said control signal;
    a level adjusting unit for level-adjusting said digital information upon receiving said control signal; and
    an adjusting memory for storing level-adjusted digital information upon receiving said control signal.

* * * * *